(12) United States Patent
Kurashina et al.

(10) Patent No.: US 11,214,880 B2
(45) Date of Patent: Jan. 4, 2022

(54) WATER ELECTROLYSIS SYSTEM AND CONTROL METHOD THEREFOR

(71) Applicant: HONDA MOTOR CO., LTD., Tokyo (JP)

(72) Inventors: Daisuke Kurashina, Wako (JP); Yuta Hoshi, Wako (JP); Yukihiro Fukushima, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 99 days.

(21) Appl. No.: 16/848,867

(22) Filed: Apr. 15, 2020

(65) Prior Publication Data

US 2020/0332426 A1  Oct. 22, 2020

(30) Foreign Application Priority Data

Apr. 18, 2019 (JP) .............................. JP2019-079376

(51) Int. Cl.
| | |
|---|---|
| C25B 15/02 | (2021.01) |
| C25B 15/08 | (2006.01) |
| C25B 1/04 | (2021.01) |
| C25B 9/19 | (2021.01) |
| C25B 9/73 | (2021.01) |
| C25B 9/05 | (2021.01) |
| C25B 9/77 | (2021.01) |

(52) U.S. Cl.
CPC ................ C25B 15/02 (2013.01); C25B 1/04 (2013.01); C25B 9/05 (2021.01); C25B 9/19 (2021.01); C25B 9/73 (2021.01); C25B 9/77 (2021.01); C25B 15/08 (2013.01)

(58) Field of Classification Search
CPC .......... C25B 1/04; C25B 15/02; C25B 15/023
See application file for complete search history.

(56) References Cited

U.S. PATENT DOCUMENTS

| 8,815,075 B2 * | 8/2014 | Takeuchi | C25B 1/04 205/628 |
|---|---|---|---|
| 10,648,093 B2 * | 5/2020 | Kurashina | C25B 15/02 |
| 10,767,272 B2 * | 9/2020 | Takeuchi | C25B 9/05 |

FOREIGN PATENT DOCUMENTS

JP  2012-219291  11/2012

* cited by examiner

*Primary Examiner* — Nicholas A Smith

(74) *Attorney, Agent, or Firm* — Amin, Turocy & Watson, LLP

(57) ABSTRACT

In a water electrolysis system and a control method therefor, when a depressurizing process is performed, pressure reducing valves for high pressure reduce the pressure of a high pressure hydrogen. A first pressure detecting sensor detects, as a first pressure, a pressure of the high pressure hydrogen on a more upstream side than the pressure reducing valves for high pressure. A second pressure detecting sensor detects, as a second pressure, a pressure of the high pressure hydrogen on a more downstream side than a first pressure reducing valve of the pressure reducing valves for high pressure. Based on the first pressure or the second pressure, a controller controls a degree of opening of a depressurization control valve.

9 Claims, 5 Drawing Sheets

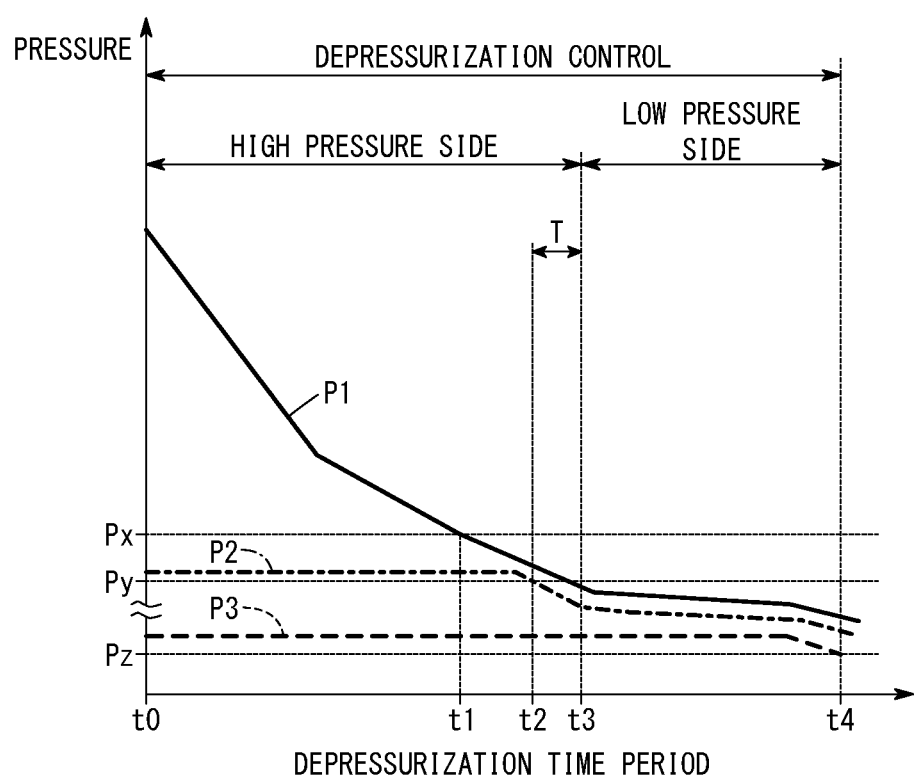

WATER ELECTROLYSIS SYSTEM AND CONTROL METHOD THEREFOR

CROSS-REFERENCE TO RELATED APPLICATION

This application is based upon and claims the benefit of priority from Japanese Patent Application No. 2019-079376 filed on Apr. 18, 2019, the contents of which are incorporated herein by reference.

BACKGROUND OF THE INVENTION

Field of the Invention

The present invention relates to a water electrolysis system that generates oxygen on an anode side by subjecting water to electrolysis, while generating high pressure hydrogen that is higher in pressure than oxygen on a cathode side, as well as a control method for such a water electrolysis system.

Description of the Related Art

In Japanese Laid-Open Patent Publication No. 2012-219291, a differential pressure type water electrolysis system is disclosed in which oxygen is generated on an anode side by subjecting the water to electrolysis, while high pressure hydrogen that is higher in pressure than the oxygen is generated on a cathode side. Such a water electrolysis system is equipped with a stack in which a plurality of cells each having a MEA (membrane/electrode assembly) including a solid polymer electrolyte membrane (PEM) are connected in series, and cathode sides thereof are filled with high pressure hydrogen, whereas water and oxygen at normal pressure exist on anode sides thereof.

In addition, in the water electrolysis system, after having carried out a high pressure hydrogen generation process (after operation of the water electrolysis system is stopped), in order to protect the MEAs inside the stack, the high pressure hydrogen on the cathode side is forcibly depressurized and reduced in pressure to be close to normal pressure. At this time, if the depressurizing process is performed rapidly, blisters are generated in the PEMs, and therefore, it is necessary to slowly discharge the high pressure hydrogen over a certain period of time. Moreover, the blisters are generated due to expansion of the hydrogen gas, which is retained inside the PEMs, not being able to escape from the PEMs accompanying depressurization of the surrounding vicinity.

SUMMARY OF THE INVENTION

Incidentally, in Japanese Laid-Open Patent Publication No. 2012-219291, when operation of the water electrolysis system is stopped, hydrogen that cross leaks from the cathode side to the anode side is returned to the cathode side by a membrane pumping effect of the PEMs, whereby reduction (deoxidation) of the anode catalyst is suppressed, and the performance of the stack is prevented from deteriorating. However, if the amount of cross leakage of hydrogen is large in contrast to the membrane pumping effect, depending on the conditions inside the PEMs, hydrogen and oxygen and the like may react with the membrane composition of the PEMs, and there is a possibility that outflowing of the membrane composition, i.e., so-called membrane thinning, may occur.

The occurrence of such membrane thinning is an important factor when maintaining the differential pressure in a differential pressure type water electrolysis system, and therefore, it is necessary to prevent outflowing of the membrane composition. Thus, in order to suppress cross leakage of hydrogen, it may be considered to increase the electrolytic current applied to the MEAs so as to enhance the membrane pumping effect. However, when the depressurizing process is performed with such a method, since hydrogen is needlessly discharged, conversely, the efficiency of the system deteriorates.

In view of the aforementioned problem, for example, as shown in FIG. 3, at a time that the depressurizing process is started, the pressure of the high pressure hydrogen on the cathode side is rapidly reduced by discharging the hydrogen at a relatively high rate of depressurization (an amount of timewise change in the pressure of the high pressure hydrogen), while on the other hand, if the pressure is reduced to a certain extent, the hydrogen may be discharged at a relatively low rate of depressurization. For this purpose, when the hydrogen is discharged from the cathode side via a pipe, the pressure of the hydrogen is detected by a pressure sensor, and based on the detected pressure, the degree of opening of a depressurization control valve provided in the pipe is adjusted.

As noted previously, at the time that the depressurizing process is started, the hydrogen pressure rapidly decreases. Therefore, it is necessary to detect the pressure using a pressure sensor having a relatively wide range. However, with a pressure sensor having a wide range, since the detection accuracy thereof is low, it is impossible to detect the hydrogen pressure in a low pressure region.

On the other hand, in such a low pressure region, since the hydrogen is discharged over a long period of time, it is necessary to detect the pressure with a pressure sensor having high detection accuracy. However, with a pressure sensor having high detection accuracy, since the detection range is narrow, it is not possible to detect the hydrogen pressure in the high pressure region.

Consequently, in the conventional method, it is difficult to appropriately control the degree of opening of the depressurization control valve in accordance with the hydrogen pressure.

The present invention has devised taking into consideration the aforementioned problems, and has the object of providing a water electrolysis system and a control method therefor, in which, by accurately controlling a depressurization control valve, it is possible to effectively suppress the generation of blisters during the depressurizing process.

The present invention relates to a water electrolysis system including an electrolyte membrane, and power supplying members disposed on both sides of the electrolyte membrane, the water electrolysis system subjecting water to electrolysis by applying an electrolytic current between the power supplying members, to thereby generate oxygen on an anode side while generating high pressure hydrogen that is higher in pressure than the oxygen on a cathode side, as well as a control method for such a water electrolysis system.

The water electrolysis system comprises a pipe, a depressurization control valve, a pressure reducing mechanism, a first pressure sensor, a second pressure sensor, and a control unit. The pipe is connected to the cathode side. Further, the depressurization control valve is provided in the pipe, and is configured to perform a depressurizing process of discharging the high pressure hydrogen from the cathode side via the pipe, by being placed in an open state after stoppage of an electrolysis process by the electrolytic current. The pressure reducing mechanism is provided in the pipe on a more upstream side in a discharging direction of the high pressure hydrogen than the depressurization control valve, and is configured to reduce a pressure of the high pressure hydrogen. The first pressure sensor is configured to detect, as a first pressure, a pressure of the high pressure hydrogen before being reduced in pressure, in the pipe on a more upstream side in the discharging direction than the pressure reducing mechanism. The second pressure sensor is configured to detect, as a second pressure, a pressure of the high pressure hydrogen after being reduced in pressure, in the pipe between the pressure reducing mechanism and the depressurization control valve. The control unit is configured to control a degree of opening of the depressurization control valve based on the first pressure or the second pressure.

Further, the control method includes first to third steps. In the first step, a depressurization control valve, which is provided in a pipe connected to the cathode side, is controlled by a control unit so as to be placed in an open state after stoppage of an electrolysis process by the electrolytic current, thereby starting a depressurizing process of discharging the high pressure hydrogen from the cathode side via the pipe. In the second step, when the high pressure hydrogen is reduced in pressure by a pressure reducing mechanism provided in the pipe on a more upstream side in a discharging direction of the high pressure hydrogen than the depressurization control valve, a first pressure sensor detects, as a first pressure, a pressure of the high pressure hydrogen before being reduced in pressure on a more upstream side in the discharging direction than the pressure reducing mechanism, and a second pressure sensor detects, as a second pressure, a pressure of the high pressure hydrogen after being reduced in pressure between the pressure reducing mechanism and the depressurization control valve. In the third step, based on the first pressure or the second pressure, the control unit controls a degree of opening of the depressurization control valve.

According to the present invention, the high pressure hydrogen is reduced in pressure by the pressure reducing mechanism, the pressure on the upstream side of the pressure reducing mechanism in the pipe is detected by the first pressure sensor, and the pressure on the downstream side is detected by the second pressure sensor. In this manner, by increasing the number of pressure sensors, it is possible to control the degree of opening of the depressurization control valve on the basis of the first pressure detected by the first pressure sensor in a high pressure region, and to control the degree of opening of the depressurization control valve on the basis of the second pressure detected by the second pressure sensor in a low pressure region. Stated otherwise, according to the present invention, the degree of opening of the depressurization control valve can be appropriately controlled by switching between the pressure sensors depending on the pressure region. Therefore, according to the present invention, while the depressurization control valve is controlled with high accuracy, it is possible to suppress the generation of blisters during the depressurizing process.

The above and other objects, features, and advantages of the present invention will become more apparent from the following description when taken in conjunction with the accompanying drawings, in which a preferred embodiment of the present invention is shown by way of illustrative example.

BRIEF DESCRIPTION OF THE DRAWINGS

FIG. 5 is a timing chart describing the control method of the water electrolysis system shown in FIG. 1.

DESCRIPTION OF THE PREFERRED EMBODIMENTS

Preferred embodiments of a water electrolysis system and a control method therefor according to the present invention will be presented and described below with reference to the accompanying drawings.

1. Configuration of Present Embodiment

Figure 1:
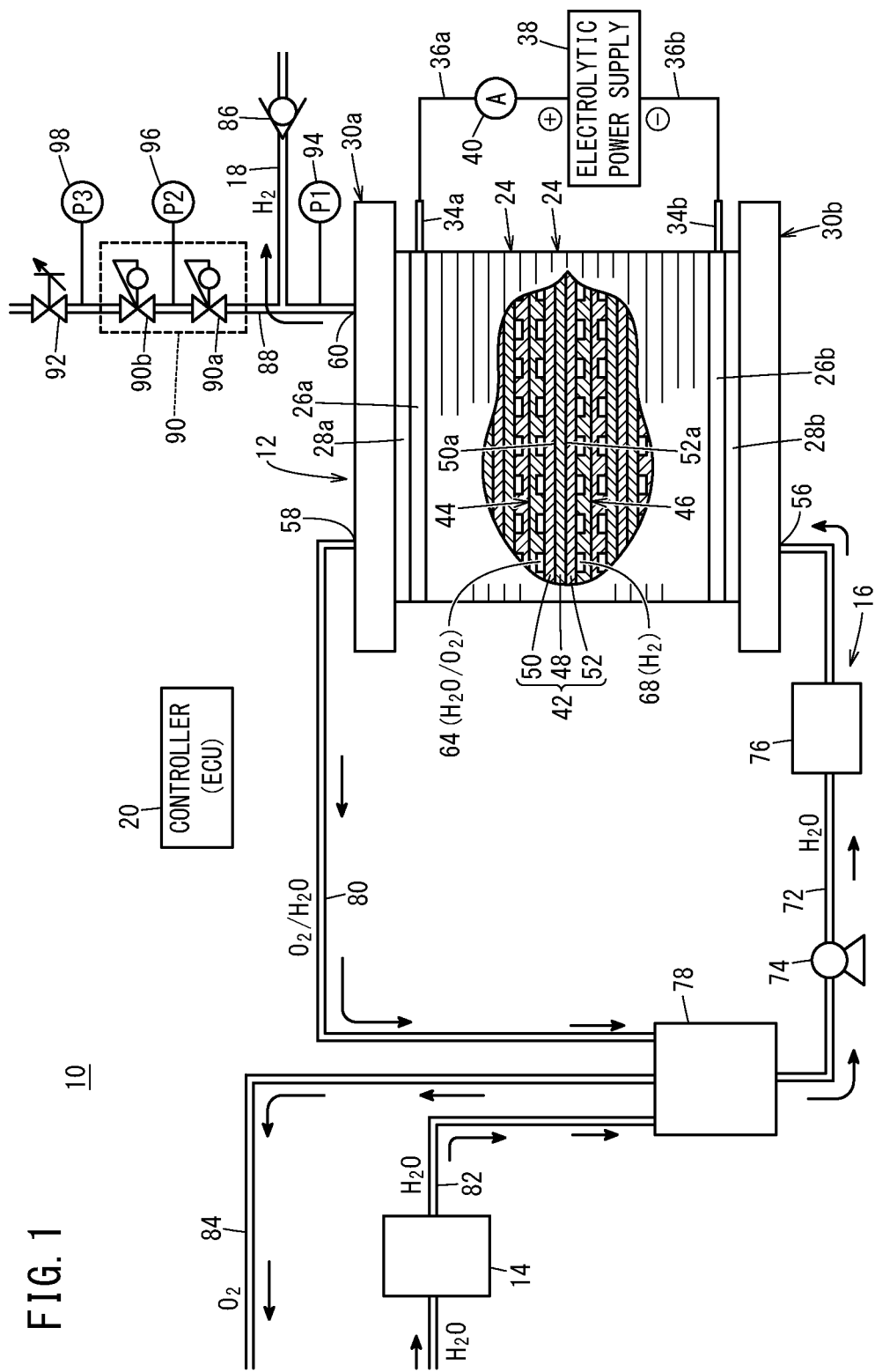
FIG. 1 is a configuration diagram of a water electrolysis system according to a present embodiment.

As shown in FIG. 1, a water electrolysis system 10 according to the present embodiment is equipped with a high pressure water electrolysis apparatus 12 that produces high pressure hydrogen (hydrogen which is higher in pressure than normal pressure, for example, 1 MPa to 100 MPa) by subjecting pure water to electrolysis, a water circulation device 16 to which pure water generated from city water is supplied via a pure water supplying device 14, and which supplies the pure water to the high pressure water electrolysis apparatus 12, together with circulating surplus water discharged from the high pressure water electrolysis apparatus 12 to the high pressure water electrolysis apparatus 12, a high pressure hydrogen pipe 18 (pipe) from which the high pressure hydrogen is led out from the high pressure water electrolysis apparatus 12, and a controller 20 (control unit).

The high pressure water electrolysis apparatus 12 constitutes a differential pressure high pressure hydrogen production device (cathode side pressure>anode side pressure), and a plurality of unit cells 24 are stacked therein. A terminal plate 26a, an insulating plate 28a, and an end plate 30a are sequentially arranged in an outward direction at one end in the stacking direction of the unit cells 24. Similarly, a terminal plate 26b, an insulating plate 28b, and an end plate 30b are sequentially arranged in an outward direction at the other end in the stacking direction of the unit cells 24. The end plates 30a and 30b are fastened and retained in an integral manner.

Terminal portions 34a and 34b are provided in an outwardly projecting manner on side portions of the terminal plates 26a and 26b. The terminal portions 34a and 34b are electrically connected via wiring 36a and wiring 36b to an electrolytic power supply 38. The terminal portion 34a which is on the anode side is connected to a positive pole of the electrolytic power supply 38, whereas the terminal portion 34b which is on the cathode side is connected to a negative pole of the electrolytic power supply 38. Moreover, in the wiring 36a, a current sensor 40 is provided for detecting the electrolytic current applied to the unit cells 24 from the electrolytic power supply 38 via the wiring 36a and the wiring 36b and the terminal portions 34a and 34b. An electrolytic current signal detected by the current sensor 40 is input to the controller 20.

Each of the unit cells 24 comprises a disk-shaped membrane electrode assembly (MEA) 42, and an anode side separator 44 and a cathode side separator 46 which sandwich the membrane electrode assembly 42 therebetween. The anode side separator 44 and the cathode side separator 46 have a disk-like shape.

The membrane electrode assembly 42, for example, is equipped with a solid polymer electrolyte membrane (PEM) 48 in which a thin film of perfluorosulfonic acid is impregnated with water, and an anode side power supplying member 50 and a cathode side power supplying member 52 provided on both surfaces of the solid polymer electrolyte membrane 48.

An anode electrode catalyst layer 50a and a cathode electrode catalyst layer 52a are formed on both surfaces of the solid polymer electrolyte membrane 48. The anode electrode catalyst layer 50a, for example, uses a ruthenium (Ru)-based catalyst, and the cathode electrode catalyst layer 52a, for example, uses a platinum catalyst.

On outer peripheral edge portions of the unit cells 24, a water supplying communication hole 56 for supplying water (pure water), a discharge communication hole 58 for discharging oxygen generated by the reaction and unreacted water (a mixed fluid), and a hydrogen communication hole 60 for allowing hydrogen generated by the reaction to flow are provided, while the communication holes communicate mutually with each other in the stacking direction.

On a surface of the anode side separator 44 facing the membrane electrode assembly 42, a first flow path 64 is provided that communicates with the water supplying communication hole 56 and the discharge communication hole 58. The first flow path 64 is provided within a range corresponding to the surface area of the anode side power supplying member 50, and includes a plurality of flow grooves, a plurality of embossments, and the like. Oxygen generated by the reaction and unreacted water flow through the first flow path 64.

A second flow path 68 that communicates with the hydrogen communication hole 60 is formed on a surface of the cathode side separator 46 facing the membrane electrode assembly 42. The second flow path 68 is provided within a range corresponding to the surface area of the cathode side power supplying member 52, and includes a plurality of flow grooves, a plurality of embossments, and the like. High pressure hydrogen generated by the reaction flows through the second flow path 68.

The water circulation device 16 comprises a circulation pipe 72 that communicates with the water supplying communication hole 56 of the high pressure water electrolysis apparatus 12. A circulation pump 74, an ion exchanger 76, and an oxygen side gas/liquid separator 78 are arranged in the circulation pipe 72.

One end of a return pipe 80 communicates with an upper part of the oxygen side gas/liquid separator 78, and another end of the return pipe 80 communicates with the discharge communication hole 58 of the high pressure water electrolysis apparatus 12. A pure water supplying pipe 82 connected to the pure water supplying device 14, and an oxygen discharge pipe 84 that discharges oxygen separated from the pure water by the oxygen side gas/liquid separator 78 are connected to the oxygen side gas/liquid separator 78.

The high pressure hydrogen pipe 18 is connected to the hydrogen communication hole 60 of the high pressure water electrolysis apparatus 12, and the high pressure hydrogen pipe 18 is connected to a hydrogen supply unit (for example, a hydrogen tank or the like) via a check valve 86 and a back pressure valve (not shown). A depressurizing pipe 88 (pipe) for discharging high pressure hydrogen from the cathode side when a later-described depressurizing process is performed branches off from the high pressure hydrogen pipe 18.

In the depressurizing pipe 88, there are sequentially provided, in this order along the discharging direction of the high pressure hydrogen, pressure reducing valves for high pressure 90 (a pressure reducing mechanism), and a depressurization control valve 92. The pressure reducing valves for high pressure 90 are equipped with a first pressure reducing valve 90a on an upstream side in the discharging direction, and a second pressure reducing valve 90b on a downstream side in the discharging direction. The first pressure reducing valve 90a and the second pressure reducing valve 90b are pressure reducing valves provided with a relief function.

A first pressure detecting sensor 94 (first pressure sensor), which detects, as a first pressure, a pressure of the high pressure hydrogen in the vicinity of the hydrogen communication hole 60, is disposed in the high pressure hydrogen pipe 18. Further, a second pressure detecting sensor 96 (second pressure sensor), which detects, as a second pressure, a pressure of the high pressure hydrogen between the first pressure reducing valve 90a and the second pressure reducing valve 90b, is disposed in the depressurizing pipe 88. Furthermore, a third pressure detecting sensor 98 (third pressure sensor), which detects, as a third pressure, a pressure of the high pressure hydrogen between the second pressure reducing valve 90b and the depressurization control valve 92, is disposed in the depressurizing pipe 88. First to third pressure signals detected by the first to third pressure detecting sensors 94 to 98 are input to the controller 20.

Moreover, the first to third pressure detecting sensors 94 to 98 have a narrower detection range (range), sequentially in order of the first pressure detecting sensor 94, the second pressure detecting sensor 96, and the third pressure detecting sensor 98. Further, the first to third pressure detecting sensors 94 to 98 have a higher detection accuracy, sequentially in order of the first pressure detecting sensor 94, the second pressure detecting sensor 96, and the third pressure detecting sensor 98.

On the basis of signals input from the current sensor 40 and the first to third pressure detecting sensors 94 to 98, the controller 20 controls the degree of opening of the depressurization control valve 92.

2. Operations of the Present Embodiment

Operations of the water electrolysis system 10 which is configured in the foregoing manner will now be described. In this instance, after having briefly described a process of generating hydrogen by the water electrolysis system 10, a description will be given of a high pressure hydrogen depressurizing process, which is the control method for the water electrolysis system 10 according to the present embodiment.

Initially, when the water electrolysis system 10 is started, pure water generated from city water is supplied via the pure water supplying device 14 to the oxygen side gas/liquid separator 78 that constitutes part of the water circulation device 16.

In the water circulation device 16, under the action of the circulation pump 74, the pure water is supplied to the water supplying communication hole 56 of the high pressure water electrolysis apparatus 12 via the circulation pipe 72. On the other hand, a normal electrolytic current is applied to the terminal portions 34a and 34b of the terminal plates 26a and 26b via the electrolytic power supply 38 which is electrically connected thereto.

For this reason, in each of the unit cells 24, water is supplied from the water supplying communication hole 56 to the first flow path 64 of the anode side separator 44, and the water moves along the interior of the anode side power supplying member 50. Accordingly, the water is decomposed by electricity at the anode electrode catalyst layer 50*a*, and hydrogen ions, electrons, and oxygen are generated. The hydrogen ions generated by such an anodic reaction permeate through the solid polymer electrolyte membrane 48, move to the cathode electrode catalyst layer 52*a* side, and are combined with electrons to thereby obtain hydrogen.

Consequently, the hydrogen flows along the second flow path 68 formed between the cathode side separator 46 and the cathode side power supplying member 52. The hydrogen flows through the hydrogen communication hole 60, in a state of being maintained at a higher pressure than the water supplying communication hole 56, and can be taken out to the exterior of the high pressure water electrolysis apparatus 12.

On the other hand, oxygen generated by the reaction and unreacted water flow through the first flow path 64, and the mixed fluid is discharged along the discharge communication hole 58 to the return pipe 80 of the water circulation device 16. After the unreacted water and the oxygen are introduced into the oxygen side gas/liquid separator 78 and separated therein, via the circulation pump 74, the water flows from the circulation pipe 72 through the ion exchanger 76 and is introduced to the water supplying communication hole 56. The oxygen that is separated from the water is discharged to the exterior from the oxygen discharge pipe 84.

Next, a description will be given with reference to FIGS. 2 to 5 concerning the high pressure hydrogen depressurizing process, which is the control method for the water electrolysis system 10 according to the present embodiment.

After the electrolysis operation of the above-described water electrolysis system 10 has been stopped, the depressurizing process is initiated by opening the depressurization control valve 92, and placing the depressurizing pipe 88 and the hydrogen communication hole 60 in communication. In this case, the depressurizing process is gradually performed by adjusting the degree of opening of the depressurization control valve 92, while applying the electrolytic current at a lower current value than the electrolytic current during the electrolysis operation. The current value is set to a minimum current value at which the membrane pumping effect can be obtained.

Figure 2:
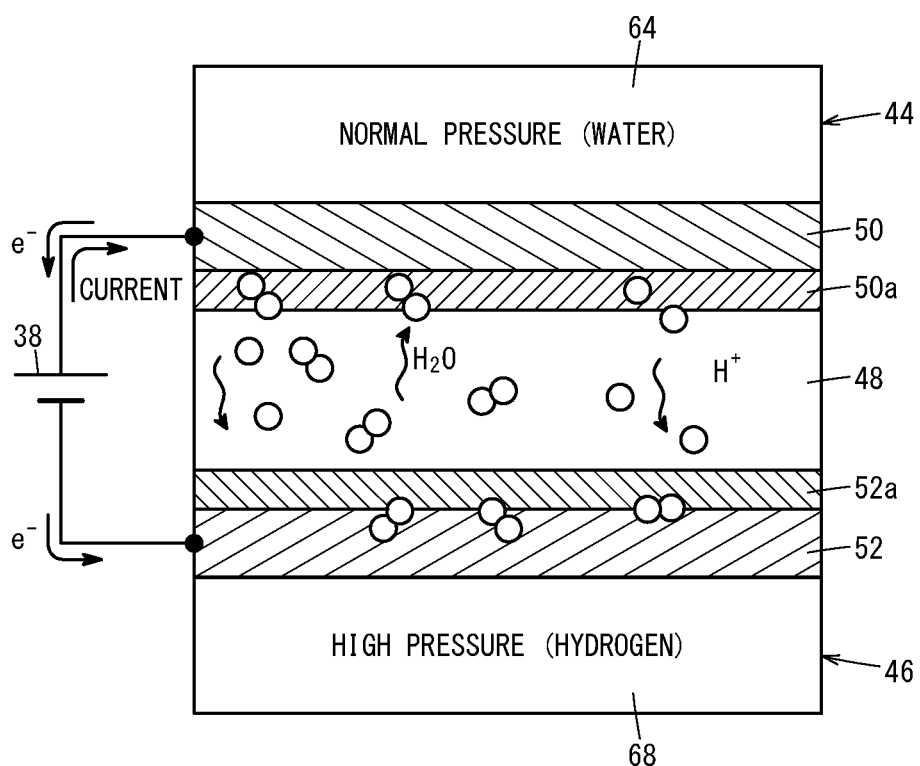
FIG. 2 is an explanatory diagram showing the behavior of hydrogen.

More specifically, as shown in FIG. 2, the hydrogen moves easily through the solid polymer electrolyte membrane 48 from the second flow path 68, which is in a state of high pressure, to the first flow path 64, which is in a state of normal pressure (referred to as cross leakage of hydrogen or hydrogen diffusion). The hydrogen that is cross leaked to the anode electrode catalyst layer 50*a* undergoes protonation again, and by the membrane pumping effect of the solid polymer electrolyte membrane 48, is returned to the cathode electrode catalyst layer 52*a* side. Accordingly, after operation of the water electrolysis system 10 has been stopped, the high pressure hydrogen that has leaked to the anode electrode catalyst layer 50*a* side is prevented from being retained, and reduction (degradation) of the anode electrode catalyst layer 50*a* is suitably prevented.

Figure 3:
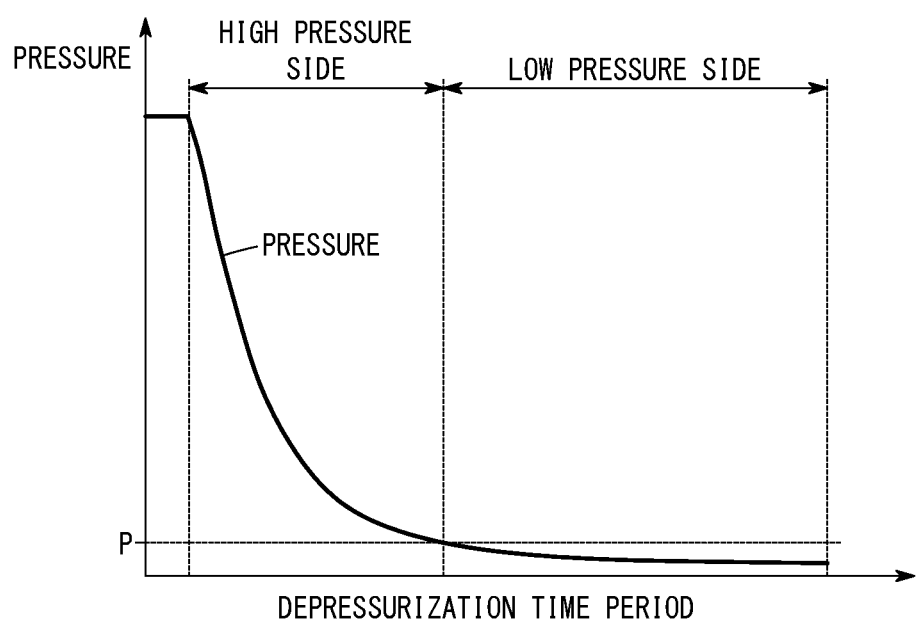
FIG. 3 is a timing chart describing a control method of the water electrolysis system shown in FIG. 1.

Additionally, in the depressurizing process, as shown in FIG. 3, at an initial stage of a depressurization time period, the high pressure hydrogen that is filled in the second flow path 68 (see FIGS. 1 and 2) on the cathode side is subjected to the depressurizing process at a relatively high rate of depressurization by opening the depressurization control valve 92. Further, in the event that the cathode side pressure of the high pressure water electrolysis apparatus 12 has fallen to a set threshold value (pressure) P, the degree of opening of the depressurization control valve 92 is reduced (throttled), and the depressurizing process is performed at a relatively low rate of depressurization. The rate of depressurization refers to an amount of timewise change in the pressure of the high pressure hydrogen.

In the foregoing manner, in the depressurizing process, the pressure of the high pressure hydrogen is rapidly reduced in the high pressure region, while on the other hand, the pressure is slowly reduced in pressure over time in the low pressure region in order to prevent the generation of blisters. In this case, in the event that only one pressure sensor were disposed in the high pressure hydrogen pipe 18 and the depressurizing pipe 88 that make up the discharge path for the high pressure hydrogen, and using the detection result of such a pressure sensor, the degree of opening of the depressurization control valve 92 were controlled in order to cause a change in the pressure of the high pressure hydrogen as shown in FIG. 3, it is difficult to control the degree of opening with high accuracy. In other words, in the case that a pressure sensor having a wide range is used to cover the high pressure region, the detection accuracy is reduced. On the other hand, in the case of using a pressure sensor of high accuracy to detect the pressure in the low pressure region, since the detection range is narrow, it is impossible to detect the pressure in the high pressure region.

Thus, with the depressurizing process of the present embodiment, by switching between the pressure sensors depending on the pressure region of the high pressure hydrogen, and by adjusting the degree of opening of the depressurization control valve 92 using the pressure detected by the pressure sensor after having been switched, the depressurization control valve 92 is accurately controlled, and the generation of blisters is suppressed.

A description will be given herein with reference to FIGS. 4 and 5 concerning the depressurizing process of the present embodiment.

Figure 4:
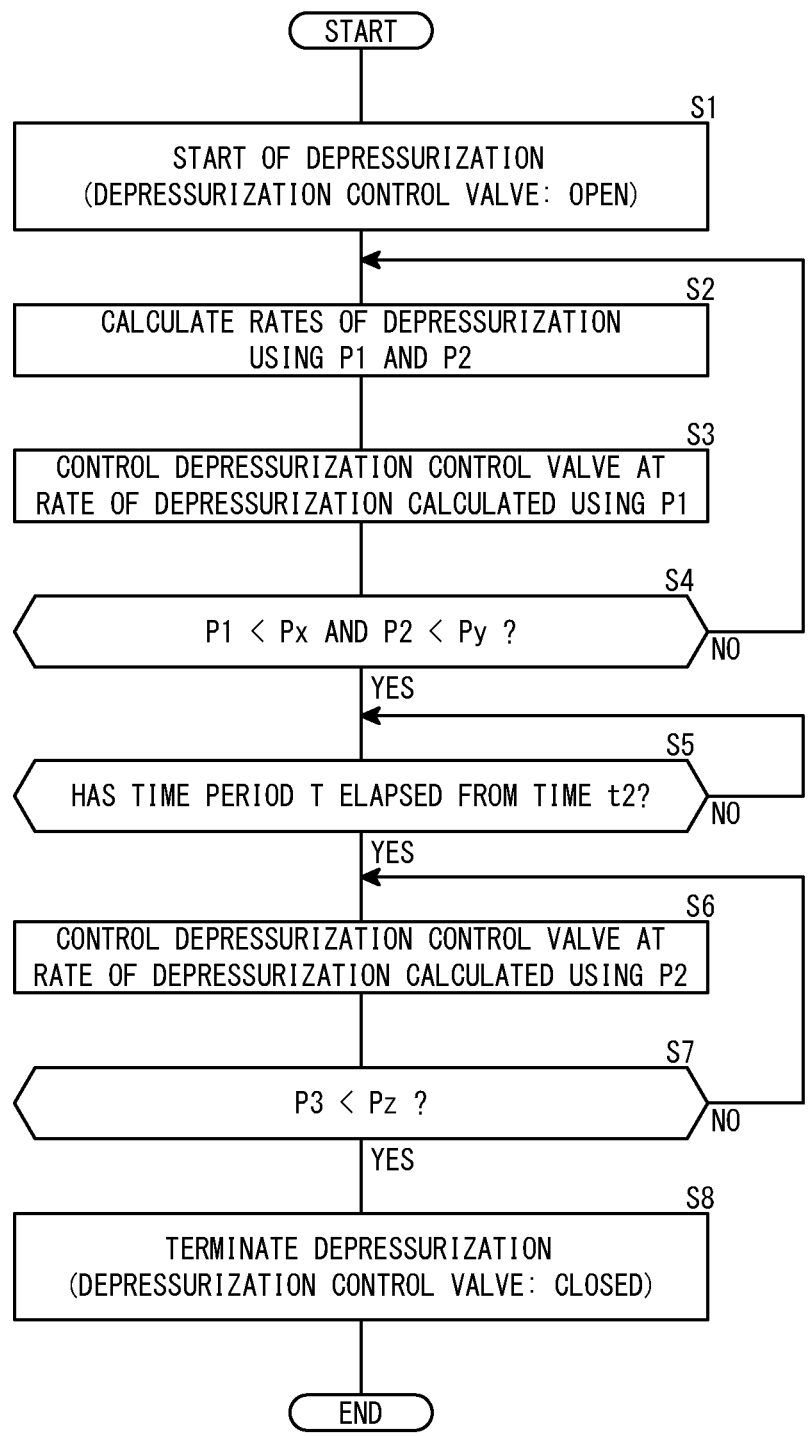
FIG. 4 is a flowchart describing the control method of the water electrolysis system shown in FIG. 1.

In step S1 (first step) of FIG. 4, at time t0 in FIG. 5, the controller 20 opens the depressurization control valve 92. Consequently, the depressurizing process is started, and the high pressure hydrogen on the cathode side is discharged to the exterior via the high-pressure hydrogen pipe 18 and the depressurizing pipe 88. As a result, as shown in FIGS. 3 and 5, the pressure of the high pressure hydrogen rapidly decreases accompanying the passage of time.

In this case, as shown in FIGS. 1 and 5, the first to third pressure detecting sensors 94 to 98 sequentially detect the pressure of the high pressure hydrogen at respective target measurement locations, and output signals indicating the detection results to the controller 20.

In greater detail, the first pressure detecting sensor 94 detects, as a first pressure P1, the pressure of the high pressure hydrogen in the high pressure hydrogen pipe 18, in other words, the pressure of the high pressure hydrogen before being reduced in pressure on a more upstream side than the pressure reducing valves for high pressure 90 (the pressure of a high pressure line).

The second pressure detecting sensor 96 detects, as a second pressure P2, the pressure of the high pressure hydrogen in the depressurizing pipe 88 between the first pressure reducing valve 90*a* and the second pressure reducing valve 90*b*, in other words, the pressure of the high pressure hydrogen which has been reduced in pressure by the first pressure reducing valve 90a (the pressure of an intermediate pressure line).

The third pressure detecting sensor 98 detects, as a third pressure P3, the pressure of the high pressure hydrogen in the depressurizing pipe 88 between the second pressure reducing valve 90b and the depressurization control valve 92, in other words, the pressure of the high pressure hydrogen which has been further reduced in pressure by the second pressure reducing valve 90b (the pressure of a low pressure line).

Then, in step S2 (second step) of FIG. 4, the controller 20 calculates the rates of depressurization of the high pressure hydrogen from the first pressure P1 and the second pressure P2, respectively.

In the initial stage of the depressurizing process, as shown in FIG. 5, the first pressure P1 decreases accompanying the passage of time, whereas the second pressure P2 and the third pressure P3 are maintained at constant values. Such a feature occurs because, even if the pressure of the high pressure hydrogen on the cathode side is in the high pressure region, and is reduced in pressure by the first pressure reducing valve 90a and the second pressure reducing valve 90b, the detected pressure lies outside of the detection ranges of the second pressure detecting sensor 96 and the third pressure detecting sensor 98.

Thus, in the following step S3 (third step), the controller 20 compares the rate of depressurization that was calculated using the first pressure P1 with a predetermined set rate, and controls (throttles) the degree of opening of the depressurization control valve 92, in a manner so that the rate of depressurization does not exceed the set rate.

In the following step S4, the controller 20 determines whether or not the first pressure P1 is less than a predetermined first pressure threshold value Px (P1<Px) and the second pressure P2 is less than a predetermined second pressure threshold value Py (P2<Py).

In this instance, the first pressure threshold value Px is a threshold value that indicates the pressurized state of the hydrogen at the location where the first pressure P1 is measured. If the inequality P1 Px is satisfied, it can be determined that the high pressure hydrogen exists in the high pressure line where the first pressure detecting sensor 94 measures the pressure of the high pressure hydrogen. On the other hand, if the inequality P1<Px is satisfied, it can be determined that the high pressure hydrogen in the high pressure line, in which the first pressure detecting sensor 94 measures the pressure of the high pressure hydrogen, is reduced in pressure.

Further, the second pressure threshold value Py is a threshold value that indicates the pressurized state of the hydrogen at the location where the second pressure P2 is measured. If the inequality P2≥Py is satisfied, it can be determined that the high pressure hydrogen exists in the intermediate pressure line where the second pressure detecting sensor 96 measures the pressure of the high pressure hydrogen. On the other hand, if the inequality P2<Py is satisfied, it can be determined that the high pressure hydrogen in the intermediate pressure line, in which the second pressure detecting sensor 96 measures the pressure of the high pressure hydrogen, is reduced in pressure.

As shown in FIG. 5, until time t1 is reached, the inequality P1≥Px holds true, and until time t2 is reached, the inequality P2≥Py holds true. Accordingly, in the time period from time t0 to time t2, a negative determination result is obtained (step S4: NO), and the processes of steps S2 and S4 are repeatedly carried out.

On the other hand, after time t2, the inequalities P1<Px and P2<Py are satisfied (step S4: YES), and therefore, the controller 20 proceeds to the following step S5. In step S5, the controller 20 determines whether or not a predetermined time period T has elapsed from time t2. In this instance, the predetermined time period T is a determination time period for the purpose of determining whether to switch the pressure used for controlling the degree of opening of the depressurization control valve 92 from the first pressure P1 to the second pressure P2.

Accordingly, if the predetermined time period T has not elapsed from time t2 (step S5: NO), the determination process of step S5 is repeatedly carried out. On the other hand, at time t3 when the predetermined time period T has elapsed from time t2 (step S5: YES), the controller 20 determines to switch the pressure used for controlling the degree of opening of the depressurization control valve 92 from the first pressure P1 to the second pressure P2, and the process proceeds to the following step S6.

In step S6 (second step, third step), using the second pressure P2 measured by the second pressure detecting sensor 96, the controller 20 calculates the rate of depressurization. The controller 20 compares the rate of depressurization that was calculated using the second pressure P2 with a predetermined set rate, and controls (throttles) the degree of opening of the depressurization control valve 92, in a manner so that the rate of depressurization does not exceed the set rate.

In the following step S7, the controller 20 determines whether or not the third pressure P3 measured by the third pressure detecting sensor 98 is less than a predetermined third pressure threshold value Pz (P3<Pz). In this instance, the third pressure threshold value Pz is a threshold value that indicates the pressurized state of the hydrogen at the location where the third pressure P3 is measured. If the inequality P3≥Pz is satisfied, it can be determined that the high pressure hydrogen exists in the low pressure line where the third pressure detecting sensor 98 measures the pressure of the high pressure hydrogen. On the other hand, if the inequality P3<Pz is satisfied, it can be determined that the depressurizing process may be terminated, since the high pressure hydrogen in the low pressure line, in which the third pressure detecting sensor 98 measures the pressure of the high pressure hydrogen, is reduced in pressure.

As shown in FIG. 5, until time t4 is reached, the inequality P3≥Pz holds true. Accordingly, in the time period from time t3 to time t4, a negative determination result is obtained (step S7: NO), and the processes of steps S6 and S7 are repeatedly carried out.

On the other hand, at time t4, in the case that the inequality P3>Pz is satisfied (step S7: YES), the controller 20 proceeds to the following step S8. In step S8, the controller 20 switches the depressurization control valve 92 to the closed state, and the depressurizing process is terminated.

3. Advantages and Effects of the Present Embodiment

As has been described above, the present embodiment relates to the water electrolysis system 10, which includes the solid polymer electrolyte membrane (electrolyte membrane) 48, and the anode side power supplying member 50 and the cathode side power supplying member 52 (power supplying members) disposed on both sides of the solid polymer electrolyte membrane 48, and is configured to subject water to electrolysis by applying an electrolytic current between the anode side power supplying member 50 and the cathode side power supplying member 52, to thereby generate oxygen on the anode side, while generating high pressure hydrogen that is higher in pressure than the oxygen on the cathode side, as well as the control method for such a water electrolysis system 10.

The water electrolysis system 10 further includes the high pressure hydrogen pipe 18 and the depressurizing pipe 88 (pipe), the depressurization control valve 92, the pressure reducing valves for high pressure 90 (pressure reducing mechanism), the first pressure detecting sensor 94, the second pressure detecting sensor 96, and the controller 20 (control unit).

The high pressure hydrogen pipe 18 and the depressurizing pipe 88 are connected to the cathode side. Further, the depressurization control valve 92 is provided in the depressurizing pipe 88, and performs the depressurizing process of discharging the high pressure hydrogen from the cathode side via the high pressure hydrogen pipe 18 and the depressurizing pipe 88, by being placed in an open state after stoppage of the electrolysis process by the electrolytic current. The pressure reducing valves for high pressure 90 are provided in the depressurizing pipe 88 on a more upstream side in the discharging direction of the high pressure hydrogen than the depressurization control valve 92, and reduce the pressure of the high pressure hydrogen. The first pressure detecting sensor 94 detects, as the first pressure P1, a pressure of the high pressure hydrogen before being reduced in pressure, on a more upstream side in the discharging direction than the pressure reducing valves for high pressure 90. The second pressure detecting sensor 96 detects, as the second pressure P2, a pressure of the high pressure hydrogen after being reduced in pressure, between the pressure reducing valves for high pressure 90 and the depressurization control valve 92. Based on the first pressure P1 or the second pressure P2, the controller 20 controls the degree of opening of the depressurization control valve 92.

Further, the control method includes the first to third steps.

In the first step (step S1 of FIG. 4), the depressurization control valve 92, which is provided in the depressurizing pipe 88 connected to the cathode side, is controlled by the controller 20 so as to be placed in an open state after stoppage of the electrolysis process by the electrolytic current, thereby starting the depressurizing process of discharging the high pressure hydrogen from the cathode side via the high pressure hydrogen pipe 18 and the depressurizing pipe 88.

In the second step (steps S2 and S6), when the high pressure hydrogen is reduced in pressure by the pressure reducing valves for high pressure 90 which are provided on a more upstream side in the discharging direction of the high pressure hydrogen than the depressurization control valve 92, the first pressure detecting sensor 94 detects, as the first pressure P1, the pressure of the high pressure hydrogen before being reduced in pressure on a more upstream side in the discharging direction than the pressure reducing valves for high pressure 90, and the second pressure detecting sensor 96 detects, as the second pressure P2, the pressure of the high pressure hydrogen after being reduced in pressure between the pressure reducing valves for high pressure 90 and the depressurization control valve 92. In the third step (steps S3 and S6), based on the first pressure P1 or the second pressure P2, the controller 20 controls the degree of opening of the depressurization control valve 92.

In the foregoing manner, the high pressure hydrogen is reduced in pressure by the pressure reducing valves for high pressure 90, the pressure (first pressure P1) on the upstream side of the pressure reducing valves for high pressure 90 is detected by the first pressure detecting sensor 94, and the pressure (second pressure P2) on the downstream side is detected by the second pressure detecting sensor 96. In this manner, by increasing the number of pressure sensors, it is possible to control the degree of opening of the depressurization control valve 92 on the basis of the first pressure P1 detected by the first pressure detecting sensor 94 in a high pressure region, and to control the degree of opening of the depressurization control valve 92 on the basis of the second pressure P2 detected by the second pressure detecting sensor 96 in a low pressure region. Stated otherwise, according to the present embodiment, the degree of opening of the depressurization control valve 92 can be appropriately controlled by switching between the pressure sensors depending on the pressure region. Therefore, according to the present embodiment, while the depressurization control valve 92 is controlled with high accuracy, it is possible to suppress the generation of blisters during the depressurizing process.

In this instance, the pressure reducing valves for high pressure 90 comprise at least one pressure reducing valve (first pressure reducing valve 90a, second pressure reducing valve 90b) provided in the middle of the depressurizing pipe 88, and which reduces the pressure of the high pressure hydrogen. In accordance with this feature, the depressurizing pipe 88 can be easily configured in a plurality of lines that differ in pressure.

In this case, the pressure reducing valves for high pressure 90 are equipped with the first pressure reducing valve 90a which is provided on the upstream side in the discharging direction inside the pressure reducing valves for high pressure 90, and reduces the pressure of the high pressure hydrogen, and the second pressure reducing valve 90b which is provided on the downstream side in the discharging direction, and further reduces the pressure of the high pressure hydrogen that has been reduced in pressure by the first pressure reducing valve 90a. The second pressure detecting sensor 96 detects, as the second pressure P2, the pressure of the high pressure hydrogen that has been reduced in pressure by the first pressure reducing valve 90a. Generally, the pressure reducing mechanism reduces the pressure of the fluid by a two-stage method including the two pressure reducing valves. Therefore, according to the present embodiment, the water electrolysis system 10 can be configured at a low cost using a commercially available pressure reducing mechanism.

Further, the water electrolysis system 10 further includes the third pressure detecting sensor 98, which detects, as the third pressure P3, the pressure of the high pressure hydrogen that has been reduced in pressure by the second pressure reducing valve 90b. In the case that the third pressure P3 is less than the third pressure threshold value Pz, the controller 20 switches the depressurization control valve 92 to a closed state to thereby terminate the depressurizing process. In accordance with this feature, the third pressure detecting sensor 98 can be constituted using a pressure sensor of high accuracy and having a narrowest detection range. As a result, a determination process concerning completion of the depressurizing process can be performed accurately and reliably.

Furthermore, the first pressure reducing valve 90a and the second pressure reducing valve 90b are provided with a relief function. In accordance with this feature, a safety countermeasure function can be implemented in the water electrolysis system 10.

Further, when the depressurizing process is started, the controller 20 controls the degree of opening of the depressurization control valve 92 based on the first pressure P1, and in the case that the first pressure P1 is less than the first pressure threshold value Px, the second pressure P2 is less than the second pressure threshold value Py, and the predetermined time period T has elapsed from time t2 at which the second pressure P2 has become less than the second pressure threshold value Py, the controller 20 controls the degree of opening of the depressurization control valve 92 based on the second pressure P2. In accordance with this feature, switching from the first pressure P1 to the second pressure P2 can be carried out efficiently and reliably.

Furthermore, the controller 20 calculates the timewise change of the first pressure P1 or the second pressure P2 as the rate of depressurization of the high pressure hydrogen, and controls the degree of opening of the depressurization control valve 92 based on the calculated rate of depressurization. In accordance with this feature, it is possible to control the degree of opening of the depressurization control valve 92, in a manner so that the rate of depressurization takes place at a desired rate.

More specifically, in order to suppress the generation of blisters, it is necessary to perform the depressurizing process in compliance with a set rate. Such a requirement becomes more severe as the low pressure region is entered into. Therefore, in the case that the depressurizing process is performed until reaching the low pressure region, the pressure is switched to the second pressure P2 that was detected by the high accuracy second pressure detecting sensor 96, the rate of depressurization is calculated using the second pressure P2 after having switched over thereto, and by controlling the degree of opening on the basis of the calculated rate of depressurization, it is possible to satisfy a required rate that is strictly limited. As a result, by carrying out a precise depressurization control on the low pressure region side where blisters are likely to be generated, the generation of blisters can be effectively suppressed.

The first pressure detecting sensor 94 may be a sensor configured to detect the first pressure P1 in a wider range than the second pressure detecting sensor 96, and the second pressure detecting sensor 96 may be a sensor having a higher detection accuracy than the first pressure detecting sensor 94. In accordance with this feature, when the depressurizing process is performed, it is possible to cover all of the pressure regions.

The present invention is not limited to the above-described embodiment, and it is a matter of course that various alternative or additional configurations could be adopted therein based on the content disclosed in the present specification.

What is claimed is:

1. A water electrolysis system including an electrolyte membrane, and power supplying members disposed on both sides of the electrolyte membrane, the water electrolysis system subjecting water to electrolysis by applying an electrolytic current between the power supplying members, to thereby generate oxygen on an anode side while generating high pressure hydrogen that is higher in pressure than the oxygen on a cathode side,
the water electrolysis system comprising:
a pipe connected to the cathode side;
a depressurization control valve provided in the pipe, and configured to perform a depressurizing process of discharging the high pressure hydrogen from the cathode side via the pipe, by being placed in an open state after stoppage of an electrolysis process by the electrolytic current;
a pressure reducing mechanism provided in the pipe on a more upstream side in a discharging direction of the high pressure hydrogen than the depressurization control valve, and configured to reduce a pressure of the high pressure hydrogen;
a first pressure sensor configured to detect, as a first pressure, a pressure of the high pressure hydrogen before being reduced in pressure, in the pipe on a more upstream side in the discharging direction than the pressure reducing mechanism;
a second pressure sensor configured to detect, as a second pressure, a pressure of the high pressure hydrogen after being reduced in pressure, in the pipe between the pressure reducing mechanism and the depressurization control valve; and
a control unit configured to control a degree of opening of the depressurization control valve based on the first pressure or the second pressure.

2. The water electrolysis system according to claim 1, wherein the pressure reducing mechanism comprises at least one pressure reducing valve provided in the pipe and configured to reduce the pressure of the high pressure hydrogen.

3. The water electrolysis system according to claim 2, wherein
the pressure reducing valve comprises:
a first pressure reducing valve provided on an upstream side in the discharging direction inside the pressure reducing mechanism in the pipe, and configured to reduce the pressure of the high pressure hydrogen; and
a second pressure reducing valve provided on a downstream side in the discharging direction inside the pressure reducing mechanism in the pipe, and configured to further reduce the pressure of the high pressure hydrogen that has been reduced in pressure by the first pressure reducing valve, and
the second pressure sensor detects, as the second pressure, the pressure of the high pressure hydrogen that has been reduced in pressure by the first pressure reducing valve.

4. The water electrolysis system according to claim 3, further comprising a third pressure sensor configured to detect, as a third pressure, the pressure of the high pressure hydrogen that has been reduced in pressure by the second pressure reducing valve,
wherein, in a case that the third pressure is less than a third pressure threshold value, the control unit switches the depressurization control valve to a closed state to thereby terminate the depressurizing process.

5. The water electrolysis system according to claim 2, wherein the pressure reducing valve is provided with a relief function.

6. The water electrolysis system according to claim 1, wherein:
when the depressurizing process is started, the control unit controls the degree of opening based on the first pressure; and
in a case that the first pressure is less than a first pressure threshold value, the second pressure is less than a second pressure threshold value, and a predetermined time period has elapsed from a time at which the second pressure has become less than the second pressure threshold value, the control unit controls the degree of opening based on the second pressure.

7. The water electrolysis system according to claim 6, wherein the control unit calculates a timewise change of the first pressure or the second pressure as a rate of depressurization of the high pressure hydrogen, and controls the degree of opening based on the calculated rate of depressurization.

8. The water electrolysis system according to claim 1, wherein:
the first pressure sensor is a sensor configured to detect the first pressure in a wider range than the second pressure sensor; and
the second pressure sensor is a sensor having a higher detection accuracy than the first pressure sensor.

9. A control method for a water electrolysis system including an electrolyte membrane, and power supplying members disposed on both sides of the electrolyte membrane, the water electrolysis system subjecting water to electrolysis by applying an electrolytic current between the power supplying members, to thereby generate oxygen on an anode side while generating high pressure hydrogen that is higher in pressure than the oxygen on a cathode side, the control method comprising:
a first step of controlling, by a control unit, a depressurization control valve, which is provided in a pipe connected to the cathode side, so as to be placed in an open state after stoppage of an electrolysis process by the electrolytic current, thereby starting a depressurizing process of discharging the high pressure hydrogen from the cathode side via the pipe;
a second step of, when the high pressure hydrogen is reduced in pressure by a pressure reducing mechanism provided in the pipe on a more upstream side in a discharging direction of the high pressure hydrogen than the depressurization control valve, a first pressure sensor detecting, as a first pressure, a pressure of the high pressure hydrogen before being reduced in pressure on a more upstream side in the discharging direction than the pressure reducing mechanism, and a second pressure sensor detecting, as a second pressure, a pressure of the high pressure hydrogen after being reduced in pressure between the pressure reducing mechanism and the depressurization control valve; and
a third step of the control unit controlling a degree of opening of the depressurization control valve based on the first pressure or the second pressure.

* * * * *